April 17, 1962  C. H. WILLSEY  3,029,849
EGG CONTENTS SEPARATING MECHANISM
Original Filed Oct. 2, 1956  6 Sheets-Sheet 1

Fig. 1

INVENTOR.
Charles H. Willsey,
BY
Cromwell, Greist + Warden
attys

April 17, 1962  C. H. WILLSEY  3,029,849
EGG CONTENTS SEPARATING MECHANISM
Original Filed Oct. 2, 1956  6 Sheets-Sheet 2
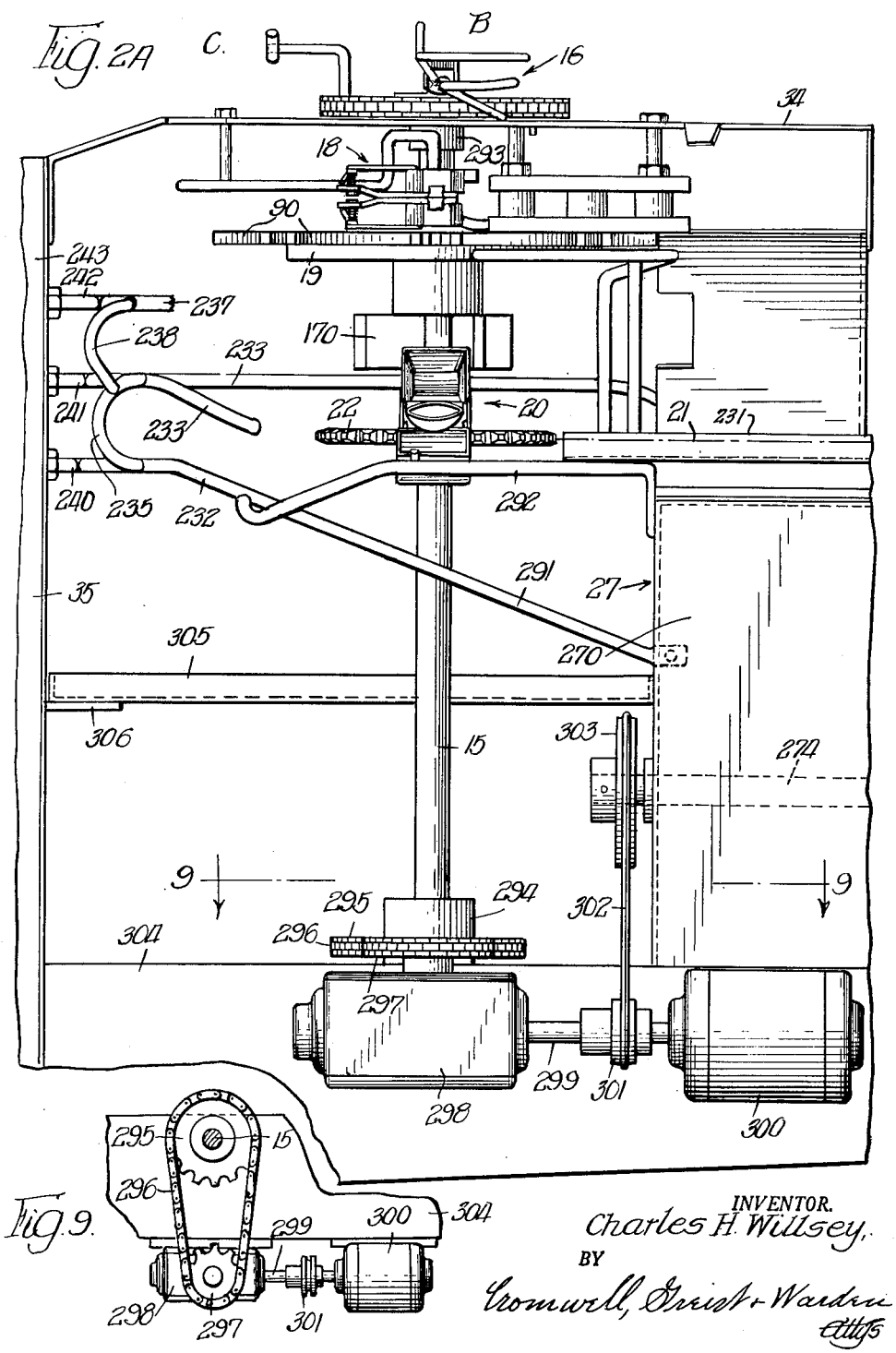
INVENTOR.
Charles H. Willsey,
BY
Cromwell, Greist & Warden
Attys

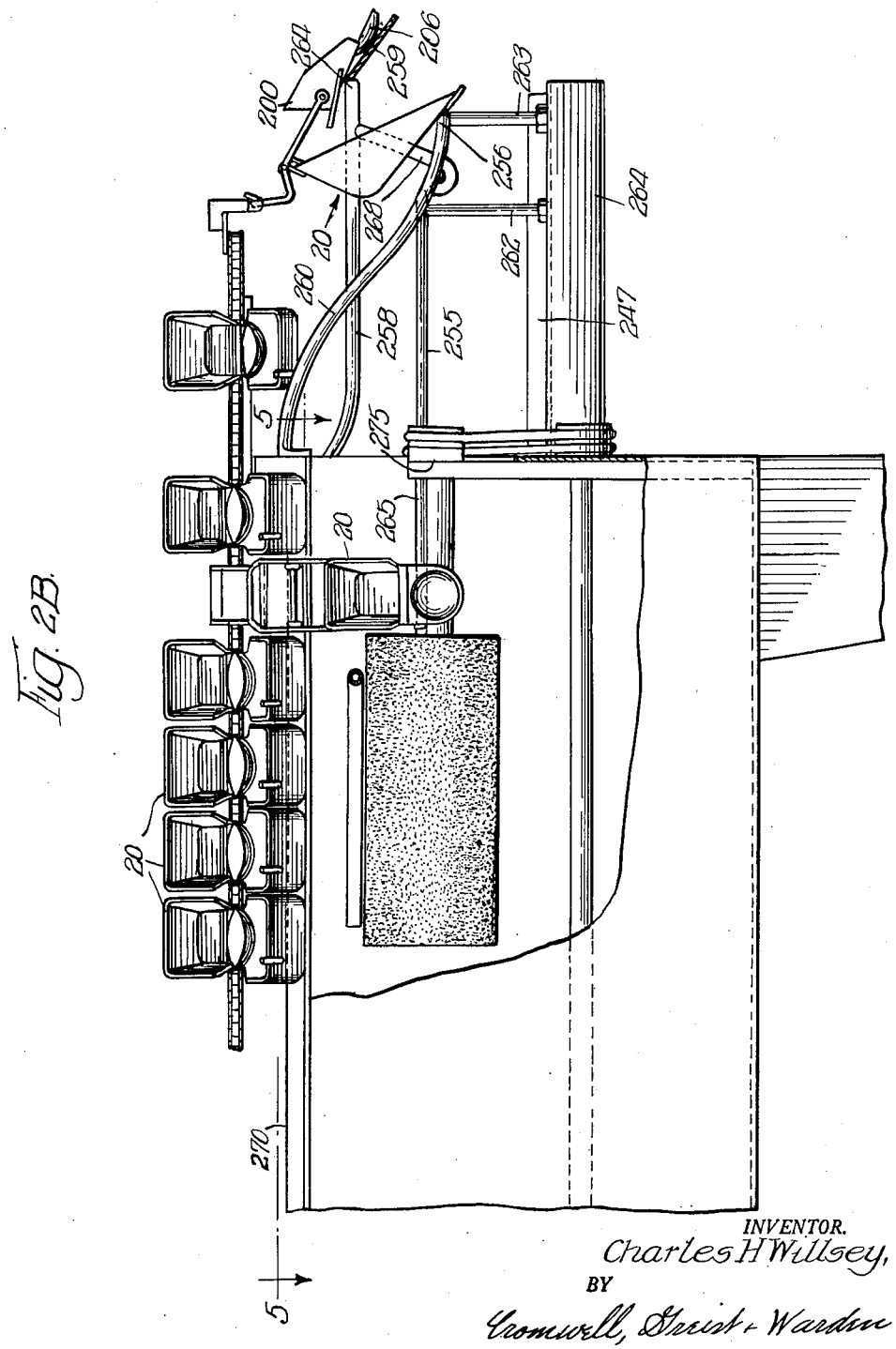

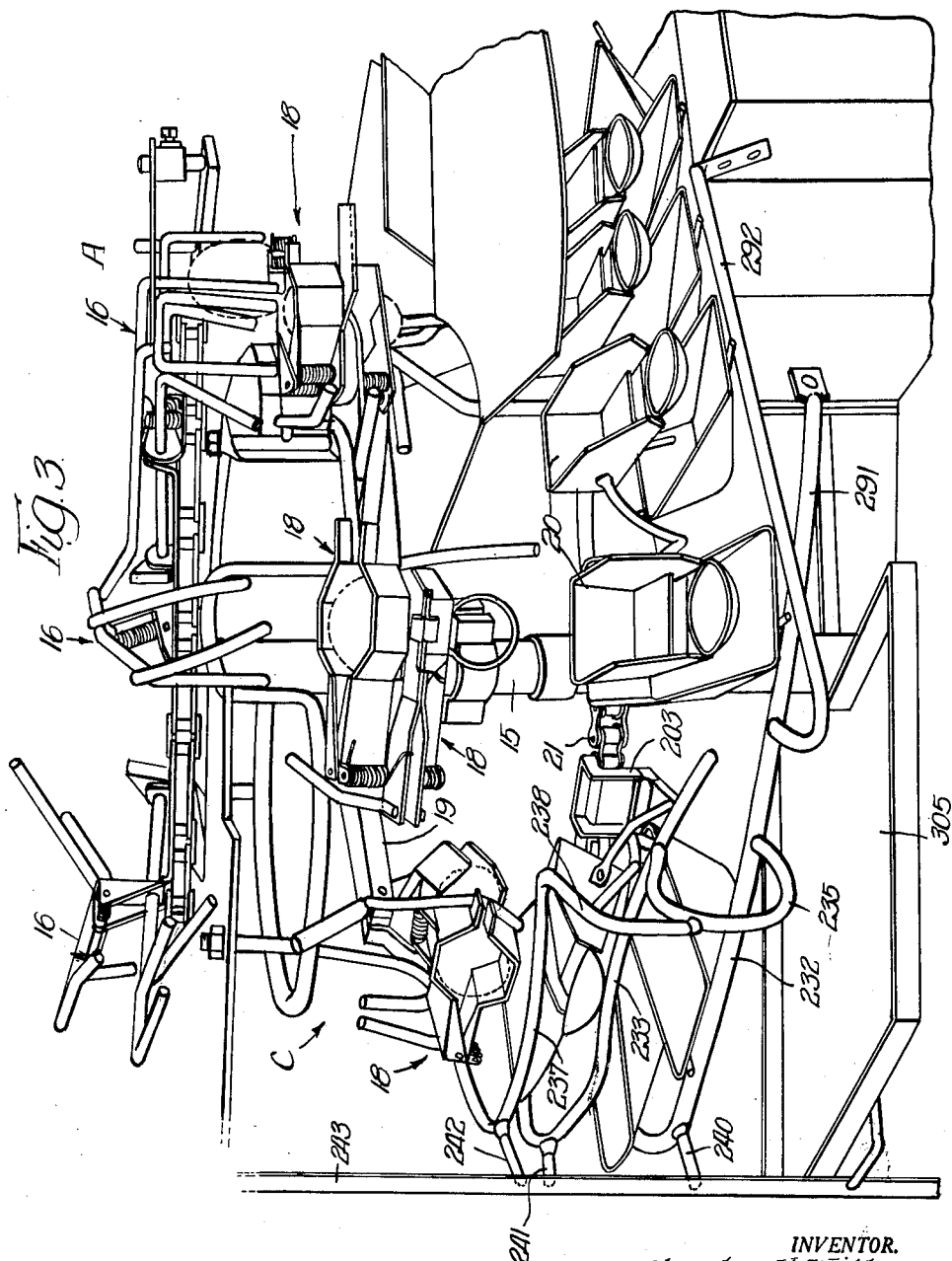

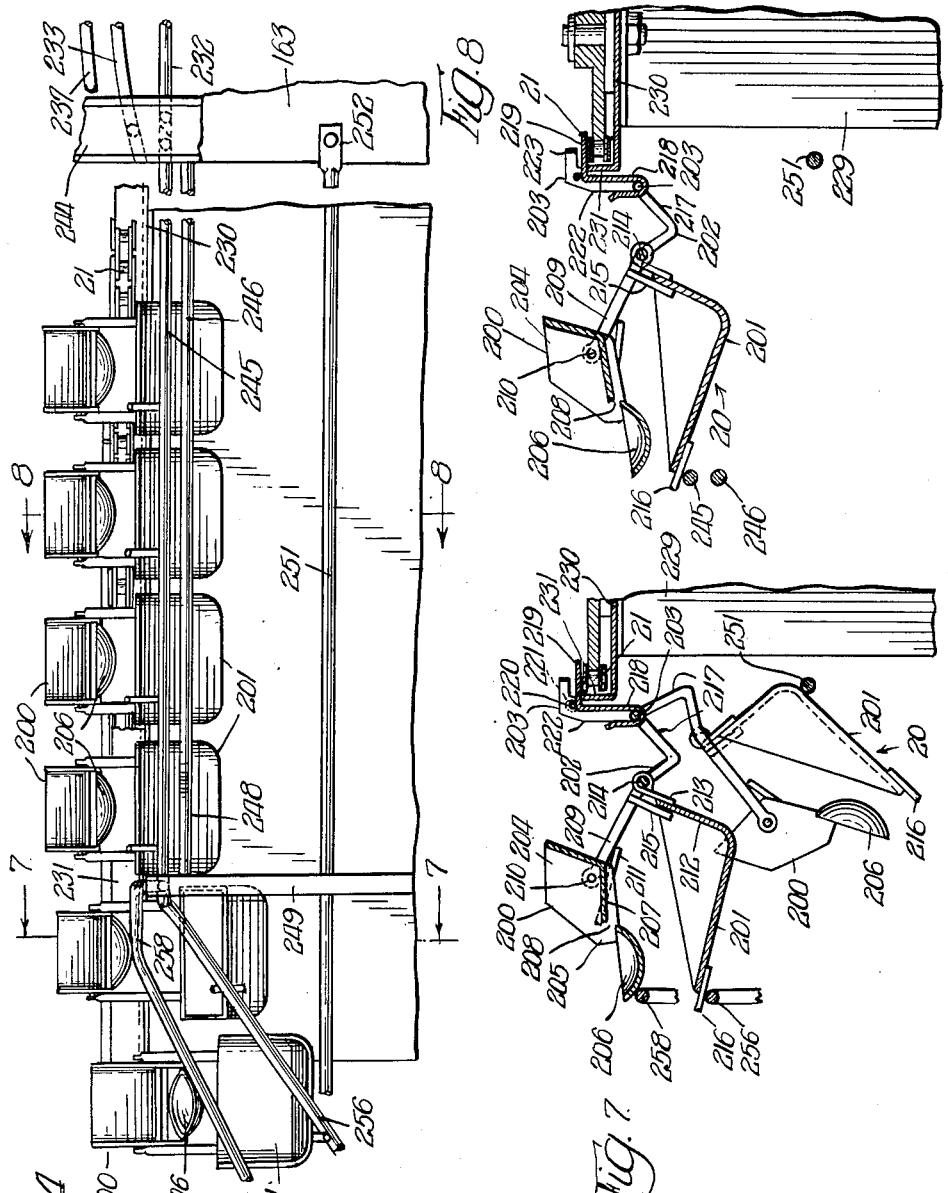

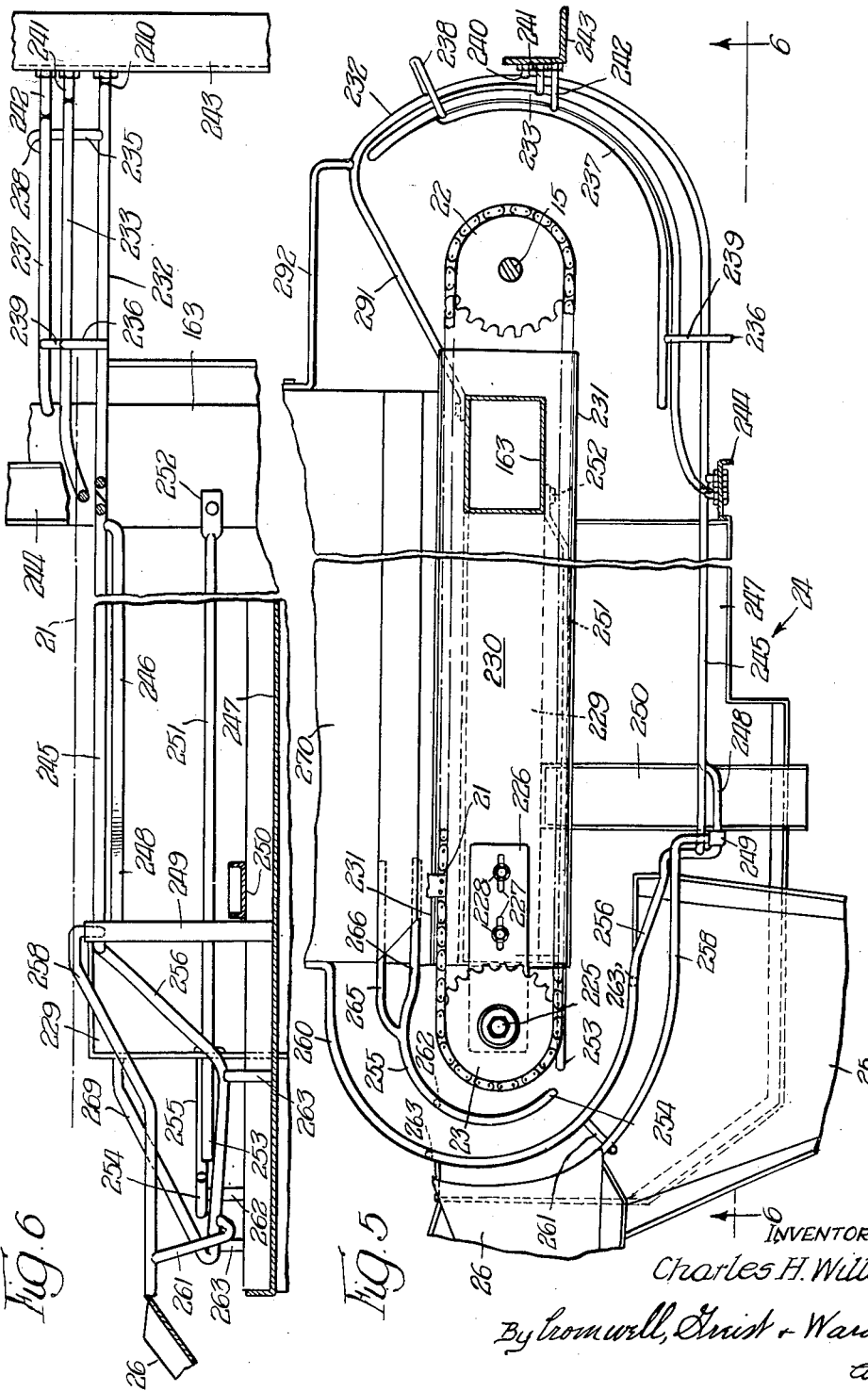

United States Patent Office 3,029,849
Patented Apr. 17, 1962

3,029,849
EGG CONTENTS SEPARATING MECHANISM
Charles H. Willsey, 1717 E. 37th St., Topeka, Kans.
Original application Oct. 2, 1956, Ser. No. 613,498, now Patent No. 2,966,184, dated Dec. 27, 1960. Divided and this application Oct. 6, 1960, Ser. No. 60,932
8 Claims. (Cl. 146—2)

This invention relates to egg handling apparatus and is more particularly concerned with improvements in a machine having mechanism for feeding eggs to a series of devices for cracking or breaking successive eggs and separating the broken shell portions so as to deliver the contents therefrom by gravity into traveling cup mechanisms which are thereafter operated to separate the yolks from the whites.

This application is a division of Serial No. 613,498, filed October 2, 1956, now U.S. Patent No. 2,966,184, issued December 27, 1960, to which reference may be had for details not hereinafter described.

Machines have heretofore been proposed for breaking or cracking eggs, separating the broken or cracked shell into two portions, removing the contents from the separated shell portions, and separating the whites from the yolks, but these machines have not been entirely satisfactory because in most cases they have not operated to provide maximum separation of the whites from the yolks with the minimum of breakage and at sufficiently high operating speeds.

It is a general object of the present invention to provide an improved egg feeding mechanism for an egg cracking machine having mechanism for automatically cracking or breaking the shells of the successive eggs and delivering the contents thereof from the broken shells to successive receptacles which are carried on a separating conveyor, with the latter having associated therewith mechanism for advancing the successive receptacles while simultaneously separating the yolks from the whites, and with adequate provisions for handling the eggs rapidly and efficiently and for maintaining the machine and the product thereof in a sanitary condition.

It is a more specific object of the invention to provide a machine wherein successive eggs are delivered on end to cracking assemblies which are spaced about the periphery of a rotating frame, the cracking assemblies are advanced by rotation of the frame while gripping the eggs at both ends, the shell of each egg is cracked and separated into two portions which are moved apart by a hinging movement of the assembly members thereby to discharge or dump the contents into separating receptacles which are carried on a chain conveyor having one end supported for movement of the egg receiving receptacles in a path beneath the cracking assemblies and wherein mechanism is associated with the receptacles for separating the yolks from the whites and for discharging the same into separate receiving trays or containers.

It is another object of the invention to provide in an egg cracking machine of the type described a conveyor having removably mounted thereon a plurality of separating cup assemblies for receiving the contents of the eggs as they are broken and the shell portions are separated wherein the cup assemblies comprise a lower white receiving pan and a pivotally connected upper tray which has at its outer edge a yolk cup separated from the remainder thereof by a clearance slot permitting the white of an egg received therein to drain over the edges of the yolk cup when the tray is tilted to position the yolk in the cup, with the white draining into the white receiving pan beneath the same, and cam elements arranged along the path of the conveyor and engageable with the pan and the tray to control the tilting thereof whereby the whites are separated from the yolks and thereafter the pan and the tray are tilted successively to dump the contents into separate receptacles positioned to receive the same.

It is a further object of the invention to provide in a mechanism of the type described an endless conveyor moving in a horizontal plane and having mounted thereon egg contents receiving devices which comprise upper and lower pivotally connected tray members which are mounted for outboard swinging movement on the conveyor, the upper tray member being provided with a yolk cup and apertures for draining the white around the edges of the yolk cup and into the lower tray member, and supporting members along the path of the conveyor for maintaining the tray members at predetermined elevations whereby they receive the egg contents, separate the white from the yolk, and successively dump the white from the lower tray and the yolk from the upper tray.

These and other objects of the invention will be apparent from a consideration of the egg handling machine which is shown by way of illustration in the accompanying drawings wherein:

FIG. 1 is a plan view, of an egg breaking and contents separating machine embodying the principal features of the invention, with portions being broken away or omitted;

FIGS. 2A and 2B together constitute an elevation, on a larger scale, of one side of the machine, with portions of the mechanism being broken away or omitted;

FIG. 3 is a perspective view, to a larger scale, of portions of the mechanism shown in FIG. 2;

FIG. 4 is a partial side elevation, taken generally on the line 4—4 of FIG. 1 and to a larger scale, showing the inspection side of the separating conveyor;

FIG. 5 is a plan view, partially in section, taken on a horizontal plane immediately above the separating conveyor, with the separating cup assemblies being omitted and with portions broken away, the view being on an enlarged scale and showing particularly the supporting rails for the cup assemblies;

FIG. 6 is a partial elevation taken on the line 6—6 of FIG. 5 with the separating cup assemblies omitted and with portions broken away;

FIG. 7 is a cross section taken on the line 7—7 of FIG. 4;

FIG. 8 is a cross section taken on the line 8—8 of FIG. 4; and

FIG. 9 is a section taken on the line 9—9 of FIG. 2A.

Referring particularly to FIGS. 1 to 3 of the drawings, the general arrangement of the several mechanisms which are incorporated in the machine and the manner in which they cooperate in the processing of the eggs will first be described briefly.

The machine preferably includes a shell egg supply mechanism in the form of an egg washing or cleaning device having an egg supporting endless conveyor 10 with the discharge or delivery end thereof positioned to deliver successive rows of 6 eggs each to a transfer or feed conveyor 11 for the cracking and separating machine, as shown in FIG. 1. The eggs, as indicated at 12, are delivered after passage through the washer to the endless chain feed conveyor 11 which is supported at its ends for movement in a horizontal plane on the end sprockets 13 and 14, the latter being mounted on the upper end of a vertical drive shaft 15 which constitutes the main driving member for the entire machine. The chain conveyor 11 carries a plurality of egg gripping or holding assemblies 16 for receiving the eggs 12 as they are delivered in row formation by the supply conveyor 10 and for advancing the eggs 12 in single row forming relation to a point adjacent the outer periphery of the end supporting sprocket 14 where the eggs are delivered to the cracking devices at the cracking station indicated at 17.

The eggs 12 are delivered, one by one, from the holding assemblies 16 on the conveyor 11 to cracking assemblies 18 which are carried around the periphery of a circular supporting frame or plate structure 19 mounted below the end sprocket 14 on the vertical power shaft 15. The cracking assemblies 18, to which the individual eggs 12 are delivered with the long axis of the same extending vertically, are constructed to engage the periphery of each successive egg and to advance the same in a circular path around the power shaft 15. The cracking assemblies 18 are pivotally connected to the periphery of the supporting frame plate 19 and are operated as they advance to crack the egg shell and then swing downwardly, as shown in FIG. 3, to a dumping position where they open up and separate the cracked shell into two portions or halves which allows the egg contents to drop by gravity into one of a plurality of separating devices 20 which are mounted in spaced relation on an endless separating conveyor 21, the latter having one end thereof supported on an end sprocket 22 (FIGS. 2A and 5) secured on the vertical power shaft 15 below the cracking head frame 19. The conveyor 21, which is arranged in a generally horizontal plane, has its other end supported on an idler sprocket 23 and the movement of the same is timed to align the separating devices 20 below the cracking assemblies 18 as they pass around the end sprocket 22. The separating devices 20 are advanced by conveyor 21 past an operator at an inspection station indicated at 24 in FIG. 1, and the yolks and whites are separated by manipulation of the separating devices 20. Thereafter the yolks and whites are delivered separately to chutes 25 and 26 and thence to collecting receptacles (not shown) for removal from the machine. Provision is made for dumping the contents, prior to separation of the yolks and whites, of any of the separating devices 20 into which the inspector finds a spoiled or inedible egg has been delivered or in which the yolk has been broken. A washing machine 27 is arranged along the return run of the conveyor 21 for cleaning and sterilizing the separating devices 20 from which broken yolks or spoiled egg meats have been removed.

The feed conveyor 11 and the cracking assemblies 18 and the operation of the same are fully described in application Serial No. 613,498, now U.S. Patent No. 2,966,184, to which reference may be had for details thereof.

The egg contents separating assemblies 20, which are carried on the separating conveyor 21, move in an endless horizontal path beneath the cracking assemblies 18 and at the cracking station 17 each of the successive separating assemblies 20 is aligned beneath a cracking assembly 18 by proper relative spacing of the latter on the turret 19 and of the separating assemblies 20 on the conveyor 21 which has one end carried on the sprocket 22 secured to the shaft 15 immediately below the turret 19.

Each of the separating assemblies 20 (FIGS. 4, 7 and 8) comprises three main portions, an upper egg receiving tray 200, a lower albumen receiving pan 201, and a bail member 202 which serves to connect the two pan-like members 200 and 201 in pivoted relation and to support the same from the chain 21 by connection with a hanger bracket 203. The upper tray portion 200 of the assembly 20, which initially receives the egg contents, includes a tray-like portion 204 which is open at the front edge and which has attached to the lower edge of forward portions of the side walls 205 thereof a yolk cup 206 of a size and shape adapted to receive the normal sized yolk of an egg. The rear end or edge of the yolk cup 206 is spaced from the forward edge of the bottom member 207 of the tray portion 204 to form a slot 208 through which the albumen may drain around the inner edge of the cup 206. The upper tray portion 204 is attached to the outer ends of the leg forming sections 209 of the supporting bail 201 by pivots 210. The pivoting of the tray portion 204 in a counterclockwise direction on the leg sections 209 is limited by an abutment stop forming member 211 projecting rearwardly of one of the side edges of the tray 204 and having its end engageable with a leg section 209.

The bottom or albumen collecting pan 201 of the separating assembly 20 is of generally triangular shape with the back wall 212 having attached thereto upstanding bearing forming member 213 which receive a pivot forming cross pin 214 extending between the leg sections 209 of the bail member 202. Relative movement between the legs 209 of the member 202 and the pan 201 is in the clockwise direction of the pan 201 and is limited by an abutment stop member 215 which extends at right angles to one of the legs 209 and is adapted to engage with the inner surface of the back wall 212 of the pan 201. The pan 201 is provided at its forward end with a forwardly projecting pin 216 for a purpose which will be described. The bail member 202 has a portion 217 bent at an angle upwardly and rearwardly of the legs 209 which is adapted to be engaged in a depending hook formation 218 on the hanger 203.

The assembly supporting hangers 203 each include an angle or base plate extension 219 at the top of the hook forming portion 218 which is secured to a link of the chain 21. A cross pin 220 extends between upstanding ears 221 on the base plate 219 and supports in pivoted relation thereon an inverted U-shaped latch element having depending legs 222 which are adapted to engage above the bight portion 217 of the member 202. A bight forming portion 223 which serves as a handle for manually swinging the latch member extends at right angles to the leg members 222 and connects the two leg members for simultaneous operation so that the bail 202 is normally held in latched relation in the hook forming portion 218 of the hanger and is readily released by manual operation of the handle forming portion 223 to swing the latching element about the pivot 220.

The separating assemblies 20 are swingable outboard of the path of travel of the supporting conveyor 21 and their movement is controlled by a series of cam rails which will be described. The one end of the conveyor 21 (FIG. 5) is supported on sprocket 22 which is secured to the vertical shaft 15 while the other end is supported on the sprocket 23 which is mounted on a stub shaft 225 on a bearing plate 226 which is slotted at 227 to receive fastening studs 228 extending upwardly of a horizontal frame support structure 229. A top plate 230 on the supporting structure 229 has its side edges upturned or flanged at 231 to provide a guide rail for holding the chain conveyor 21 in proper alignment by engagement of the top of the rail forming flange 231 beneath the hangers 203 on which the separating assemblies 20 are supported.

The separating assemblies 20 are carried around the vertical shaft 15 by the conveyor 21 and sprocket 22 in a generally outwardly extending position and in vertical alignment beneath the cracking assemblies 18 which are positioned on the turret head 19 above the same. At the point in their movement at which the separating assemblies 20 receive the egg contacts from an opened up cracking assembly 18 the lower albumen tray portion 201 is supported on the end of an arcuate lower rail 232 (FIGS. 2A, 3, 5 and 6) while the upper tray-like portion 200 and the attached yolk cup 206 are supported in an outwardly extending slightly upwardly inclined position by an arcuate rail 233 which is arranged in spaced relation above the rail 232 and supported therefrom by connecting bracket members 235 and 236. A guard rail 237 is preferably provided in spaced relation above the rail 233 and is supported therefrom by connecting brackets 238 and 239. The rails 232, 233 and 237 are braced by connecting brackets 240, 241 and 242 which extend from the upright post 243 forming part of the main frame 35.

Each succeeding assembly 20 is held in the position in which it receives the egg contents as it travels in a circular path around the shaft 15 and receives any additional albumen which is blown from the shells by an air jet mechanism 170. As the chain 21 leaves the end supporting sprocket 22 the successive separating assemblies 20 pass by an inspection station 24 (FIGS. 1 and 5) at which an operator is positioned. The guard rail 237 terminates as the assemblies 20 approach the inspection station 24 and the supporting rails 232 and 233 also terminate with their ends attached to a depending bracket forming member 244. At this point the support of the separating assemblies 20 is transferred to the uppermost one of a pair of generally parallel supporting rails 245 and 246 which extend along the run of the conveyor 21 above a collection pan 247 at the inspection station 24. The rails 245 and 246 are supported one above the other at the one end by the depending bracket 244 with the bottom pan 201 of each assembly normally supported on the top rail 245 which is at a lower level than the supporting rail 233 so that the top tray portion 200 is tilted sufficiently to position the yolk in the yolk cup 206 and allow the albumen to drain over the edges thereof into the lower albumen collecting pan 201, the latter being held at a substantially horizontal level.

As the separating assemblies 20 pass the inspection station 24, the operator is able to observe the condition of the contents and provision is made for dumping any one of the assemblies which is carrying an egg not in condition to be separated. By exerting pressure rearwardly on the projecting pin 216 at the forward end of the tray 201, the tray 201 may be pivoted about the pin 214 and the hanger member 203 sufficiently to allow the entire assembly to swing clear of the upper supporting rail 245 and dump the contents into the tray 247 beneath the same. If the character of the egg meats is such that it is desired to remove it entirely by a dumping operation, this can be done at a point near the end of the rails 245 and 246 by merely pushing on the pin 216 sufficiently to transfer the support of the assembly 20 from the uppermost rail 245 to the lowermost rail 246 as the assembly moves by the inspection station 24. The bottom rail 246 has an offset portion 248 (FIGS. 4 to 6) at the end thereof where it is attached to a vertical support post 249 forming part of the framework of the machine. The offset portion 248 allows the assembly 20 to swing to a vertical position to dump the entire contents into a disposal tray or chute 250 positioned below the same and above the collecting tray 247. The chute 250 is, of course, connected with a suitable disposal container (not shown). A back rail 251 for guiding assemblies which are dumped has one end attached at 252 to the outer face of the shell disposal chute 163. This rail 251 terminates at 253 adjacent the end 254 of an arcuate rail 255 which guides the dumped and soiled assemblies 20 into the housing 270 for the washing machine 27 which is supported along the rear run of the conveyor 21. The assemblies 20 which are observed to be in condition for separation of the whites or albumen from the yolks are allowed to continue with the lower pan 201 supported on the upper rail 245 until the assemblies 20 pass the supporting post 249 where the rail 245 has a downwardly and inwardly curved extension 256 which allows the albumen collecting pan 201 to drop to a lower level and simultaneously tilt forwardly and downwardly to an inclined position and dump the contents into a collecting tray or chute 25 for discharge from the machine. Meanwhile, the yolk cup 206 is picked up by an upper rail section 258 which has an upper end supported by the post 249 and which extends downwardly around the end of the conveyor 21. The rail section 258 over which the cup 206 initially travels curves partially around the end of the conveyor 21 and terminates at a discharge chute 26 into which the yolk is dumped. The lower rail 256 which carries the albumen tray 201 continues past the chute 26 and has an upwardly inclined section 260 extending to the top of the casing for the washing machine 27 so that the entire assembly 20, after the separation, rides on the rail section 260 to the top of the washing machine.

The upper rail section 258 is supported from the lower rail section 256 by a connecting bracket 261. Suitable upstanding rods or posts 262 and 263 support the rail 255 and the lowermost portion of the rail 256 above a horizontally extending bracket 264 on the end of the frame 229 of the machine. The lower inner rail 255 is split at it approaches the washing machine to provide two rail sections 265 and 266 for separating the paths of the two tray portions 200 and 201 of the assemblies 20 for the washing operation. The collecting trays and chutes 247, 250, 25 and 26 are removably supported by suitable brackets or the like on the supporting frame 229 of the machine so that they may be readily removed for cleaning.

As the separating assemblies 20 which have passed through the washing machine 27 emerge, cleaned and sterilized, from the open end of the washer housing 270, they engage with a guide rail 291 (FIGS. 2A and 5) which brings them up to supporting rails 232 and 233 at the cracking station 17. Those assemblies 20 which do not go through the washing machine 27 supported on the top of the housing 270 as they advance and pass over the washing machine and onto the rail 292 on which they move to the support rails 232 and 233 at the cracking station 17.

The verticaly mounted power drive shaft 15 (FIGS. 2A and 9) is supported in top and bottom bearings 293 and 294. A drive sprocket 295 is mounted on the shaft 15 adjacent the bottom bearing 294 and connected by a drive chain 296 with the output sprocket 297 of a change speed device 298. The input shaft 299 of the change speed device 298 is connected to the power shaft of a drive motor 300. A pulley 301 on the drive shaft 299 is connected by a drive belt 302 with a pulley 303 on the end of the power shaft 274 for operating the washing apparatus. The motor 300 and the change speed device 298 are mounted on a cross frame member 304 at the bottom of the machine, which also supports the bottom bearing 294 for the vertical power shaft 15.

In operating the machine the eggs are delivered by the conveyor 10 to the feed conveyor 11 and received in the holder assemblies 16, with the eggs being supplied in rows of 6 each as they come from a conventional shipping case, and preferably with the eggs being washed and sterilized while they are on the conveyor 10. Each egg is carried by a holder 16 to the delivery station A (FIGS. 1 and 8) where the holder assembly 16 is allowed to rotate 90 degrees and then release the egg so that the latter drops by gravity into a cracking assembly 18 which is aligned below the feed holder assembly 16. The egg is gripped in the assembly and the shell cracked as the entire assembly 18 swings downwardly and advances toward station C where the dumping occurs (FIG. 3). An empty separating assembly 20 is moved by the conveyor chain 21 into vertical alignment beneath each cracking assembly 18 at station C with the lower pan 201 supported on the lower rail 232 and the upper pan 200 supported on the upper rail 233. The upper pan 200 is positioned only a very short distance below the egg as the cracked shell portions are opened up by operation of the assembly 18 and the egg contents is delivered by gravity into the pan portion 200 so that there is a minimum of broken yolks in the operation of the mechanism. The cracking assemblies 18 and the separating assemblies 20 travel in vertical alignment around the shaft 15 and any white which clings to the shell portions is blown out by operation of the air jet assembly, a portion of which is indicated at 170 and which travels for a predetermined distance with the same. The white removed by the air jet assembly 170 is delivered to the upper pan 200 of the separating assembly 20 and subsequently separated with the white delivered by gravity.

The separating assemblies 20 with the egg contents in the upper pan 200 are advanced along the supporting rails 232 and 233 to the rail 245 where the upper pan 200 of each assembly is tilted sufficiently to move the yolk into the cup 206 and drain the white around the edge of the same into the lower pan 201. The operator at inspection station 24 observes the contents of each assembly and any broken yolks are immediately dumped into pan 247 by pushing the lower pan 201 toward the chain 21 a sufficient distance to pivot the entire assembly on the bail portion 218 and permit it to swing clear of both support rods 245 and 246. If a bloody egg is observed, the operator pushes the lower pan toward the chain 21 a sufficient distance for the pan 201 to drop to lower support rail 246 on which it rides until the assembly reaches the offset portion 248 thereof where it rides off the rail 246 and dumps the contents into the pan 250 below the same. The assemblies which carry egg meats observed to be in condition for separation are carried to the end of support rail 245 where the upper pan 200 rides on rail 258 while the lower pan 201 rides on rail 256 for dumping of the contents in the chutes 26 and 25, respectively. These assemblies then continue around to the cracking station 17 being carried over the top of the housing 270. The assemblies 20 which have been dumped at the inspection station are carried, in depending relation, to the washing machine and are directed into the housing by the split rails 265 and 266. As the cleaned and sterilized assemblies 20 emerge from the washing machine they are swung up to the station C by engagement with support rail 291 (FIG. 2A).

The separating assemblies 20 may, of course, be readily removed from the conveyor 21 when it is desired, for any reason, to replace them and a new one substituted while they are passing between the inspection station 24 and the cracking station 17.

I claim:

1. An egg contents separating means comprising an endless conveyor having a plurality of receptacles mounted thereon, which receptacles are adapted to receive the contents of an egg, said receptacles each comprising an upper pan forming member having a yolk cup forming portion at the outer side thereof, a lower albumen collecting pan of generally triangular form, a supporting bail member pivotally connected at the inner end to said conveyor for swinging movement outwardly and downwardly of the path of said conveyor, said bail member being pivotally connected adjacent its outer end to the inner end of said upper pan forming member, said lower albumen collecting pan being pivotally connected adjacent its inner end to said bail member intermediate the ends of the latter for swinging movement beneath said upper pan member, a stop member for limiting the swinging movement of said upper pan member in the direction of said lower albumen collecting pan, a supporting rail extending for a predetermined distance along said conveyor and engaging beneath said lower albumen collecting pan for supporting said receptacles in a horizontal position during their movement along the same, and supplemental rails extending beyond the end of said supporting rail for engaging beneath said upper pan member and said lower albumen collecting pan, said supplemental rails curving downwardly to cause said upper pan member and said albumen collecting pan to tilt outwardly and downwardly relative to said conveyor for discharging the contents over the outer side thereof.

2. An egg contents separating means comprising an endless conveyor having a plurality of receptacles mounted thereon, which receptacles are adapted to receive the contents of successive eggs, said receptacles each comprising an upper pan forming member having a yolk cup forming portion at the outer side thereof, a lower albumen collecting pan of generally triangular form, a supporting bail member pivotally connected at the inner end to said conveyor for swinging movement outwardly and downwardly of the path of said conveyor, said bail member being pivotally connected to the inner end of said upper pan forming member, said lower albumen collecting pan having its inner end pivotally connected to said bail member intermediate its ends, a stop member for limiting the swinging movement of said upper pan member in the direction of said lower albumen collecting pan, a supporting rail extending for a predetermined distance along said conveyor and engaging beneath the outer end of said lower albumen collecting pan for supporting said receptacle with the albumen collecting pan in a generally horizontal position and with the upper pan forming member tilted outwardly and downwardly during their movement along the same, and supplemental rails extending beyond the end of said supporting rail for engaging beneath the outer ends of said upper pan member and said lower albumen collecting pan, said supplemental rails being positioned to cause said upper pan member and said albumen collecting pan to tilt outwardly and downwardly relative to said conveyor for discharging the contents over the outer side thereof.

3. In an egg contents separating mechanism, a receptacle adapted to receive the contents of an egg, which receptacle comprises an upper pan forming member of generally triangular shape having a bottom terminating in a yolk cup forming an outer side thereof, a lower albumen collecting pan of generally triangular form, a supporting bail member adapted to be pivotally connected at the inner end thereof to a traveling support for swinging movement outwardly and downwardly of the same, said upper pan member having a pivotal connection with said bail member adjacent its inner end, said lower albumen collecting pan member having a pivotal connection adjacent its inner end with an intermediate portion of said bail member for swinging movement about an axis parallel to the axis of the pivotal connection of said upper pan member with said bail member, a stop member on said upper pan member and engaging said bail member for limiting the swinging movement of said upper pan member toward said lower albumen collecting pan, a rail extending for a predetermined distance along the path of said traveling support and having a portion engaging beneath said lower albumen collecting pan for supporting the same and said upper pan member in a generally horizontal position, said rail having an adjoining portion for supporting said lower albumen collecting pan at a lower level to cause said upper pan member and said albumen collecting pan to tilt outwardly and downwardly relative to said conveyor for discharging the contents over the outer side thereof.

4. An egg contents separating mechanism comprising an endless chain conveyor arranged for movement in a generally horizontal plane having a plurality of separating receptacles mounted thereon, which receptacles are adapted to receive the contents of successive eggs, said receptacles each comprising an upper pan forming member having side and rear walls and a bottom wall with a portion thereof sloping upwardly and outwardly of the rear wall and terminating at a yolk cup forming portion at the outer side thereof, a lower albumen collecting pan having a generally triangular form, a supporting bail member for said receptacle which is pivotally connected at its inner end to said conveyor for swinging movement outwardly and downwardly of the path of said conveyor, said upper pan forming member being pivotally connected to said bail member adjacent the rear wall thereof, said lower albumen collecting pan member having its inner end pivotally connected to an intermediate portion of said bail member for swinging movement beneath said upper pan member, a stop member on said upper pan member and engageable with said bail member for limiting the swinging movement of said upper pan member toward said lower albumen collecting pan, a supporting rail formation extending for a predetermined distance along the path of said conveyor and having portions engaging beneath the outer edge of said lower albumen collecting pan for supporting the latter in a horizontal position during movement along the same, said rail formation having other portions for engaging beneath the outer edge of said upper pan member and the outer edge of said lower albumen collecting pan for supporting said upper pan member and said albumen collecting pan in outwardly and downwardly tilted relation to said conveyor for discharging the contents over the outer side thereof.

5. An egg contents separating means comprising an endless conveyor having a plurality of receptacles mounted thereon, which receptacles are adapted to receive the contents of an egg, said receptacles each comprising an upper pan forming member having a yolk cup forming portion at the outer side thereof, a lower albumen collecting pan, a supporting bail member pivotally connected at the inner end to said conveyor for swinging movement outwardly and downwardly of the path of said conveyor, said bail member being pivotally connected adjacent its outer end to said upper pan forming member, said lower albumen collecting pan being pivotally connected to said bail member for swinging movement beneath said upper pan member, a stop member for limiting the downward swinging movement of said upper pan member on said bail member, a supporting rail extending for a predetermined distance along said conveyor and engaging beneath said lower albumen collecting pan for supporting said receptacles in upwardly opening, horizontal position during their movement along the same, and means beyond the end of said supporting rail for engaging said upper pan member and said lower albumen collecting pan in supporting relation and for causing said upper pan member and said albumen collecting pan to tilt outwardly and downwardly relative to said conveyor for discharging the contents over the outer side thereof.

6. An egg contents separating means comprising an endless conveyor having a plurality of receptacles mounted thereon, which receptacles are adapted to receive the contents of successive eggs, said receptacles each comprising an upper pan member having a yolk cup forming portion at the outer side thereof, a lower albumen collecting pan, a supporting bail member pivotally connected to said conveyor for swinging movement outwardly and downwardly of the path of said conveyor, said bail member being pivotally connected to the inner end of said upper pan member, means pivotally connecting said lower albumen collecting pan to said bail member, means for limiting the swinging of said upper pan member on said bail member in the direction of said lower albumen collecting pan, a supporting rail extending for a predetermined distance along said conveyor and engaging said lower albumen collecting pan for supporting said pan members with the albumen collecting pan in a generally horizontal position and with the upper pan member tilted outwardly and downwardly during their movement along the same so that the yolk moves into said yolk cup and the albumen drains into the lower pan member, and means at the end of said supporting rail for engaging said pan members so as to cause said upper pan member and said albumen collecting pan to tilt outwardly and downwardly relative to said conveyor for discharging the contents over the outer side thereof.

7. In an egg contents separating mechanism, a device adapted to receive the contents of an egg, which device comprises an upper pan member having an open outer side and a bottom terminating in a yolk cup, a lower albumen collecting pan having a back, bottom and sides with an open outer end, a supporting bail member adapted to be pivotally connected to a traveling support for swinging movement outwardly and downwardly of the same, said upper pan member having a pivotal connection with said bail member, said lower albumen collecting pan member having a pivotal connection with said bail member for swinging movement about an axis parallel to the axis of the pivotal connection of said upper pan member with said bail member, a stop member on said upper pan member for limiting the swinging movement of said upper pan member toward said lower albumen collecting pan, a rail extending for a predetermined distance along the path of said traveling support and means on said lower albumen collecting pan for engaging said rail so that said pan members are carried in a generally horizontal position, said rail having an adjoining portion for supporting said lower albumen collecting pan at a lower level to cause said upper pan member and said albumen collecting pan to tilt outwardly and downwardly relative to said conveyor for discharging the contents over the outer side thereof.

8. An egg contents separating mechanism comprising an endless conveyor arranged for movement in a generally horizontal plane and having a plurality of separating devices mounted thereon, which devices are adapted to receive the contents of successive eggs, said devices each comprising an upper pan forming member having side and rear walls and a bottom wall with a portion thereof sloping upwardly and outwardly of the rear wall and terminating at a yolk cup forming portion at the outer side thereof, a lower albumen collecting pan having side and rear walls and a bottom wall with the outer side open, a supporting bail member for said pans which is pivotally connected to said conveyor for swinging movement outwardly and downwardly of the path of said conveyor, said upper pan being pivotally connected to said bail member adjacent the rear wall thereof, said lower pan having its inner end pivotally connected to said bail member for swinging movement beneath said upper pan, a stop member for limiting the swinging movement of said upper pan toward said lower pan, a supporting rail formation extending for a predetermined distance along the path of said conveyor and means at the outer edge of said lower pan for engaging said rail and supporting said lower pan in a horizontal position during movement along the same, said rail formation having vertically spaced, inclined portions for engaging said upper pan and said lower pan so as to support said pans in outwardly and downwardly tilted relation to said conveyor for discharging the contents over the outer sides thereof.

References Cited in the file of this patent
UNITED STATES PATENTS
2,815,055    Willsey _____ Dec. 3, 1957